US012658749B2

(12) United States Patent
Zhang et al.

(10) Patent No.: US 12,658,749 B2
(45) Date of Patent: Jun. 16, 2026

(54) FLUX-CONCENTRATING ROTOR STRUCTURE

(71) Applicant: Delta Electronics, Inc., Taoyuan City (TW)

(72) Inventors: Xiaoxiang Zhang, Taoyuan City (TW); Hsin-Yi Huang, Taoyuan City (TW); Ji Dai, Taoyuan City (TW); Tzu-Ting Hsu, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 281 days.

(21) Appl. No.: 18/614,969

(22) Filed: Mar. 25, 2024

(65) Prior Publication Data

US 2025/0253727 A1    Aug. 7, 2025

(30) Foreign Application Priority Data

Feb. 7, 2024    (CN) .......................... 202410172140.0

(51) Int. Cl.
 *H02K 1/279* (2022.01)
 *H02K 1/276* (2022.01)
(52) U.S. Cl.
 CPC ........... *H02K 1/279* (2022.01); *H02K 1/2773* (2013.01)
(58) Field of Classification Search
 CPC ...... H02K 1/279; H02K 1/2773; H02K 1/276; H02K 1/2766

(Continued)

(56) References Cited

U.S. PATENT DOCUMENTS 6,528,920 B2 *  3/2003  Matsunobu ............ H02K 1/276
                                        310/156.56
7,923,881 B2 *  4/2011  Lonel .................... H02K 1/276
                                        310/156.79

(Continued)

FOREIGN PATENT DOCUMENTS

CN          101123386 B  * 12/2010
CN          102403811 A  * 4/2012

(Continued)

*Primary Examiner* — Charles Reid, Jr.
(74) *Attorney, Agent, or Firm* — KIRTON McCONKIE; Evan R. Witt

(57)            ABSTRACT

A flux-concentrating rotor structure is disclosed and includes an iron core and plural magnet components. The iron core is formed by stacking plural silicon steel sheets and includes plural magnet-receiving slots arranged along a circumferential direction. Each magnet-receiving slot has a T-shaped section. Each two adjacent magnet-receiving slots have a radial bridge, whereby each silicon steel sheet is integrally formed. The magnet components are arranged in the iron core, and correspondingly received within the magnet-receiving slots. Each magnet component includes two radial magnets and one tangential magnet. The two radial magnets are located on both sides of the tangential magnet along the circumferential direction and in contact with the tangential magnet. The two radial magnets are magnetized along the radial direction respectively and have opposite magnetizing directions. The tangential magnet is magnetized along the tangential direction. The tangential magnets in two adjacent magnet components have opposite magnetizing directions.

15 Claims, 8 Drawing Sheets

1

(58) Field of Classification Search
    USPC .................................................... 310/156.56
    See application file for complete search history.

(56) References Cited

U.S. PATENT DOCUMENTS

| | | | | |
|---|---|---|---|---|
| 9,923,436 | B2 * | 3/2018 | Takahashi | H02K 1/2766 |
| 10,790,721 | B2 * | 9/2020 | Tschida | H02K 1/28 |
| 11,177,707 | B2 | 11/2021 | Dong et al. | |
| 2013/0082561 | A1 * | 4/2013 | Mantovani | H02K 1/278 |
| | | | | 310/156.38 |
| 2022/0393531 | A1 * | 12/2022 | Ozaki | H02K 1/276 |
| 2024/0106287 | A1 * | 3/2024 | Chien | H02K 1/32 |

FOREIGN PATENT DOCUMENTS

| | | | | | |
|---|---|---|---|---|---|
| CN | 103825420 | A | * | 5/2014 | |
| CN | 104485762 | A | | 4/2015 | |
| CN | 104734447 | A | | 6/2015 | |
| CN | 106655696 | A | | 5/2017 | |
| CN | 108288883 | A | | 7/2018 | |
| CN | 108448755 | A | * | 8/2018 | H02K 1/24 |
| CN | 110707891 | A | | 1/2020 | |
| CN | 111725919 | A | | 9/2020 | |
| CN | 112803637 | A | | 5/2021 | |
| CN | 216390628 | U | | 4/2022 | |
| CN | 112994291 | B | | 9/2022 | |
| CN | 217486249 | U | | 9/2022 | |
| CN | 116827015 | A | | 9/2023 | |
| CN | 220156327 | U | * | 12/2023 | |
| TW | I571033 | B | | 2/2017 | |
| WO | 2023241475 | A1 | | 12/2023 | |

* cited by examiner

2a

FLUX-CONCENTRATING ROTOR STRUCTURE

CROSS-REFERENCE TO RELATED APPLICATION

This application claims priority to China Patent Application No. 202410172140.0, filed on Feb. 7, 2024. The entireties of the above-mentioned patent application are incorporated herein by reference for all purposes.

FIELD OF THE INVENTION

The present disclosure relates to a rotor structure, and more particularly to a flux-concentrating rotor structure applied to a permanent magnet synchronous motor and including magnet components fixed through an integrated rotor core for facilitating the producing and assembling, improving the flux-concentrating capacity and increasing the motor output torque.

BACKGROUND OF THE INVENTION

Generally speaking, a permanent magnet synchronous motor (PMSM) is a synchronous motor whose rotor uses permanent magnets instead of an electric excitation winding mechanism. The motor structure includes a shaft, a rotor and a stator. The shaft is connected with the rotor. The stator includes windings disposed thereon, and the rotor includes permanent magnets disposed thereon. Moreover, the rotor is formed by stacking rotor laminations such as multi layers of silicon steel sheets. In the PMSM, the rotor is rotated to drive the shaft due to the magnetic interaction generated between the stator and the rotor.

In the prior arts, the types of the rotor structure for the permanent magnet (PM) motor can be divided into a surface-mounted PM rotor and a tangential-set PM rotor according to the arrangement of the rotor magnets and the magnetizing direction. The magnets of the surface-mounted PM rotor are magnetized along the radial direction. However, the quadrature-axis inductance and the direct-axis inductance of the surface-mount PM rotor are equal, and it results in poor capability of flux-weakening. Moreover, the reluctance torque cannot be generated during the operation of the motor, and it is not conducive to improving the motor power density and the overload capacity. In addition, stainless steel sleeves or carbon fiber protective sleeves are often needed to protect and fix the magnets in the surface-mounted PM rotor. On the other hand, the magnets of the tangential-set PM rotor are magnetized along the tangential direction. However, since the salient pole ratio of the tangential-set PM rotor is small, the reluctance torque generated during motor operation is small, and it is not conducive to improving the motor power density and the overload capacity. In addition, the size of the magnetic field provided by the tangential-set PM rotor is related to the width of the magnetizing direction. If a larger magnetic field strength is required, the product needs to be implemented with a larger rotor during product design, and thus the space occupied has to be increased. Furthermore, the tangential-set PM rotor has several problems such as large leakage of rotor flux and low torque/power density.

Therefore, there is a need of providing a flux-concentrating rotor structure applied to a permanent magnet synchronous motor, to obviate the drawbacks encountered by the prior arts.

SUMMARY OF THE INVENTION

An object of the present disclosure is to provide a flux-concentrating rotor structure applied to a permanent magnet synchronous motor. By fixing magnet components fixed through an integrated rotor core, it facilitates the entire structure to be produced and assembled. Moreover, under the same magnet dosage and working conditions, the flux-concentrating capacity is further improved, so that the motor has a higher air-gap flux density, and the motor output torque capability is improved. At the same time, the purposes of improving the motor salient pole ratio, the motor reluctance torque and the capacity of the flux-weakening expansion of the motor are achieved.

Another object of the present disclosure is to provide a flux-concentrating rotor structure suitable for the motor architecture with an outer rotor or an inter rotor. Since the magnet components are fixed through an iron core formed by stacking integrated silicon steel sheets, there is no need to use stainless steel sleeves or carbon fiber protective sleeves for protection and fixation. The iron core is formed by stacking multiple layers of silicon steel sheets, and a plurality of T-shaped magnet-receiving slots are spaced apart to each other on the iron core through multiple radial bridges. In that, each of the multiple layers of silicon steel sheets is integrally formed, and it helps to simplify the entire manufacturing and assembling processes. As long as the silicon steel sheet meets the structural strength requirements, the magnet-receiving slot is not limited to an open type or a closed type. Each magnet component is composed of two radial magnets and one tangential magnet. For example, the two radial magnets are both in the shape of a curved tile, and the tangential magnet is in the shape of a cuboid. The two radial magnets are located on both sides of the tangential magnet and in contact with the tangential magnet. By placing the two radial magnets on both sides of the tangential magnet in the magnet-receiving slot, the assembly of the magnet component is completed easily. In addition, the two radial magnets and the one tangential magnet in one magnet component are arranged in a T-shaped structure on a radial section of the iron core, and the bottom of the T-shaped magnet component can face the air gap side of the motor. In this way, under the same magnet dosage and the same working conditions, it allows to improve the flux-concentrating capacity, whereby the motor has a higher air-gap flux density, and the motor output torque capability is improved. In the same magnet component, the tangential magnet is magnetized along a tangential direction of the iron core, the two radial magnets are magnetized along the radial direction of the iron core, and the magnetizing directions of the two radial magnets are opposite to each other. With the arrangement of the magnetizing directions, it allows to increase the motor salient pole ratio of the motor, and the purposes of increasing the motor reluctance torque and improving the capacity of the flux-weakening expansion of the motor are achieved at the same time. Furthermore, the two radial magnets correspondingly arranged in adjacent two sets of magnet components have an identical magnetizing direction and are connected through a radial bridge, and it is beneficial to reducing the magnet loss. On the other hand, in one single magnet component, the two radial magnets are both in the shape of a curved tile, and the tangential magnet is in the shape of a cuboid to facilitate assembly into the T-shaped magnet-receiving slot. Certainly, each radial magnet can also be composed of one cuboid, a plurality of cuboids, one curved tile or a plurality of curved tiles, to further reduce the magnet loss.

In accordance with an aspect of the present disclosure, a flux-concentrating rotor structure is provided. The flux-concentrating rotor structure includes an iron core and a plurality of magnet components. The iron core is formed by stacking a plurality of silicon steel sheets and includes a plurality of magnet-receiving slots arranged along a circumferential direction of the iron core. Each of the magnet-receiving slots has a T-shaped section in a radial direction of the iron core. Each two adjacent ones of the magnet-receiving slots have a radial bridge disposed therebetween, whereby each of the silicon steel sheets is integrally formed into one piece through the radial bridges. The plurality of magnet components are disposed around and arranged in the iron core, and correspondingly received within the plurality of magnet-receiving slots. Each of the magnet components includes two radial magnets and one tangential magnet, and the two radial magnets are located on both sides of the tangential magnet along the circumferential direction and in contact with the tangential magnet. The two radial magnets in each of the magnet components are magnetized along the radial direction respectively and have two magnetizing directions opposite to each other, the tangential magnet is magnetized along a tangential direction of the iron core, and the tangential magnets in two adjacent ones of the magnet components have two opposite magnetizing directions.

In an embodiment, the flux-concentrating rotor structure is used to construct a permanent magnet synchronous motor, the permanent magnet synchronous motor includes a stator sleeved outside or inside the flux-concentrating rotor structure in the radial direction, and an air gap is formed between the stator and the flux-concentrating rotor structure.

In an embodiment, the plurality of magnet components disposed on each of the silicon steel sheets are spaced apart from each other through the radial bridges.

In an embodiment, the radial magnets of each two adjacent ones of the magnet components are arranged adjacently through a corresponding one of the radial bridges and have an identical magnetizing direction relative to each other.

In an embodiment, the two radial magnets in each of the magnet components are both in the shape of a curved tile, the curved tile has a center of curvature facing an axis, and the tangential magnet is in the shape of a cuboid.

In an embodiment, each of the two radial magnets is composed of one cuboid, a plurality of cuboids, one curved tile or a plurality of curved tiles.

In an embodiment, each of the magnet components has a T-shaped section in the radial direction of the iron core.

In an embodiment, the T-shaped section includes a bottom formed by a lateral side of the tangential magnet, and the bottom faces an air gap side.

In an embodiment, the flux-concentrating rotor structure is an outer rotor, the section of the iron core in the radial direction is a hollow annular, the bottom faces an inner circumferential side, and an inner stator is correspondingly disposed inside the inner circumferential side.

In an embodiment, the two radial magnets and the tangential magnet have lateral surfaces away from an axis to be aligned with each other along the circumferential direction.

In an embodiment, the flux-concentrating rotor structure is an inner rotor, the section of the iron core in the radial direction is a hollow annular, the bottom faces an outer circumferential side, and an outer stator is correspondingly disposed outside the outer circumferential side.

In an embodiment, the two radial magnets and the tangential magnet have lateral surfaces close to an axis to be aligned with each other along the circumferential direction.

In an embodiment, the iron core further includes a plurality of circumferential bridges disposed adjacent to bottoms of the T-shaped sections of the magnet-receiving slots, and each of the circumferential bridges is configured to contact a lateral wall of a corresponding one of the tangential magnets.

In an embodiment, the iron core further includes a plural pairs of holding portions disposed adjacent to bottoms of the T-shaped sections of the magnet-receiving slots, and each pair of the holding portions is configured to contact a lateral wall of a corresponding one of the tangential magnets.

In an embodiment, the plurality of magnet components includes 2N magnet components with 4N radial magnets and 2N tangential magnets, wherein N is an integer, and N≥1.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
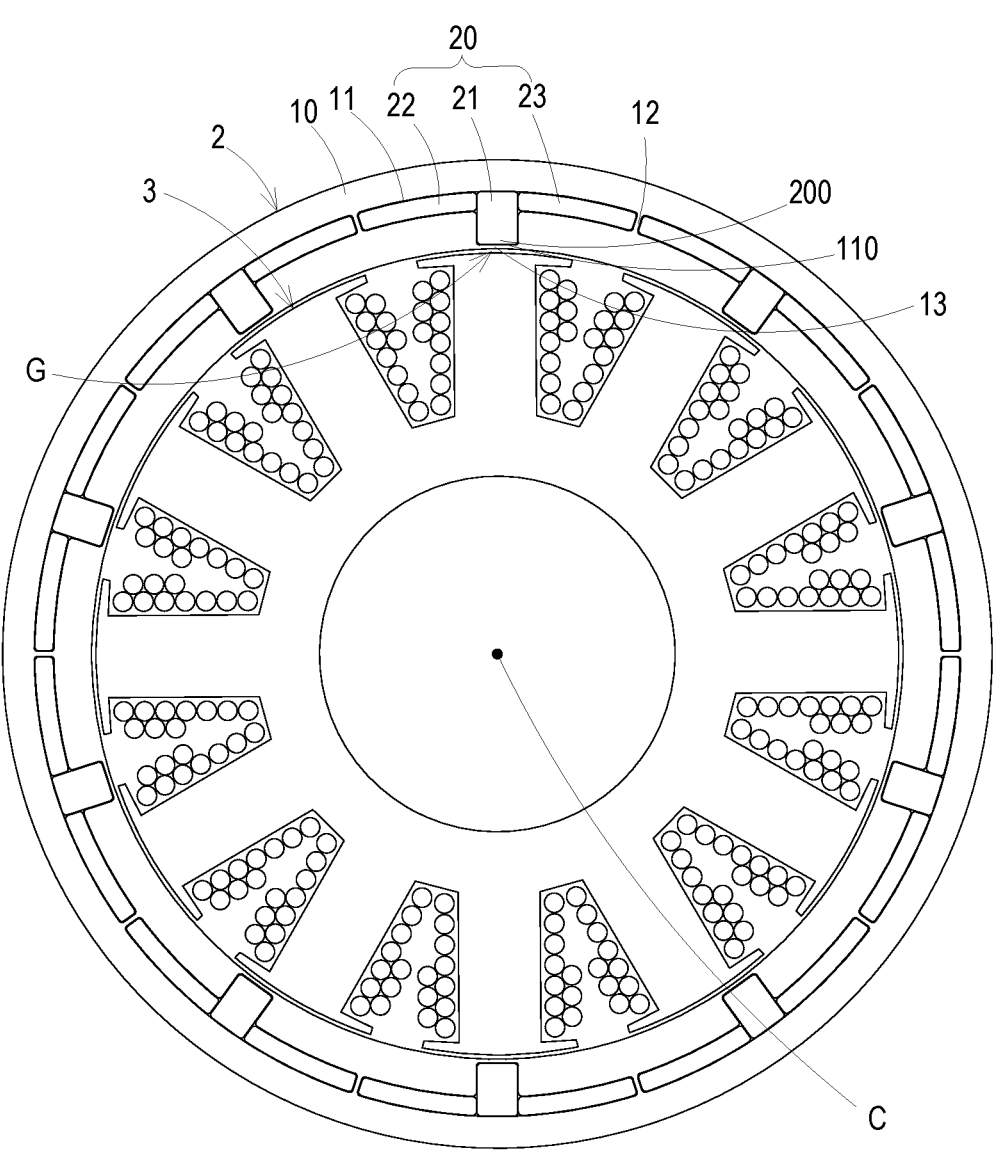
FIG. 1 is a schematic diagram illustrating a flux-concentrating rotor structure applied to a permanent magnet synchronous motor according to a first embodiment of the present disclosure.

The present disclosure will now be described more specifically with reference to the following embodiments. It is to be noted that the following descriptions of preferred embodiments of this disclosure are presented herein for purpose of illustration and description only. For example, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "bottom," "left," "right," "inside," "outside" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Besides, "and/or" and the like may be used herein for including any or all combinations of one or more of the associated listed items.

Figure 2:
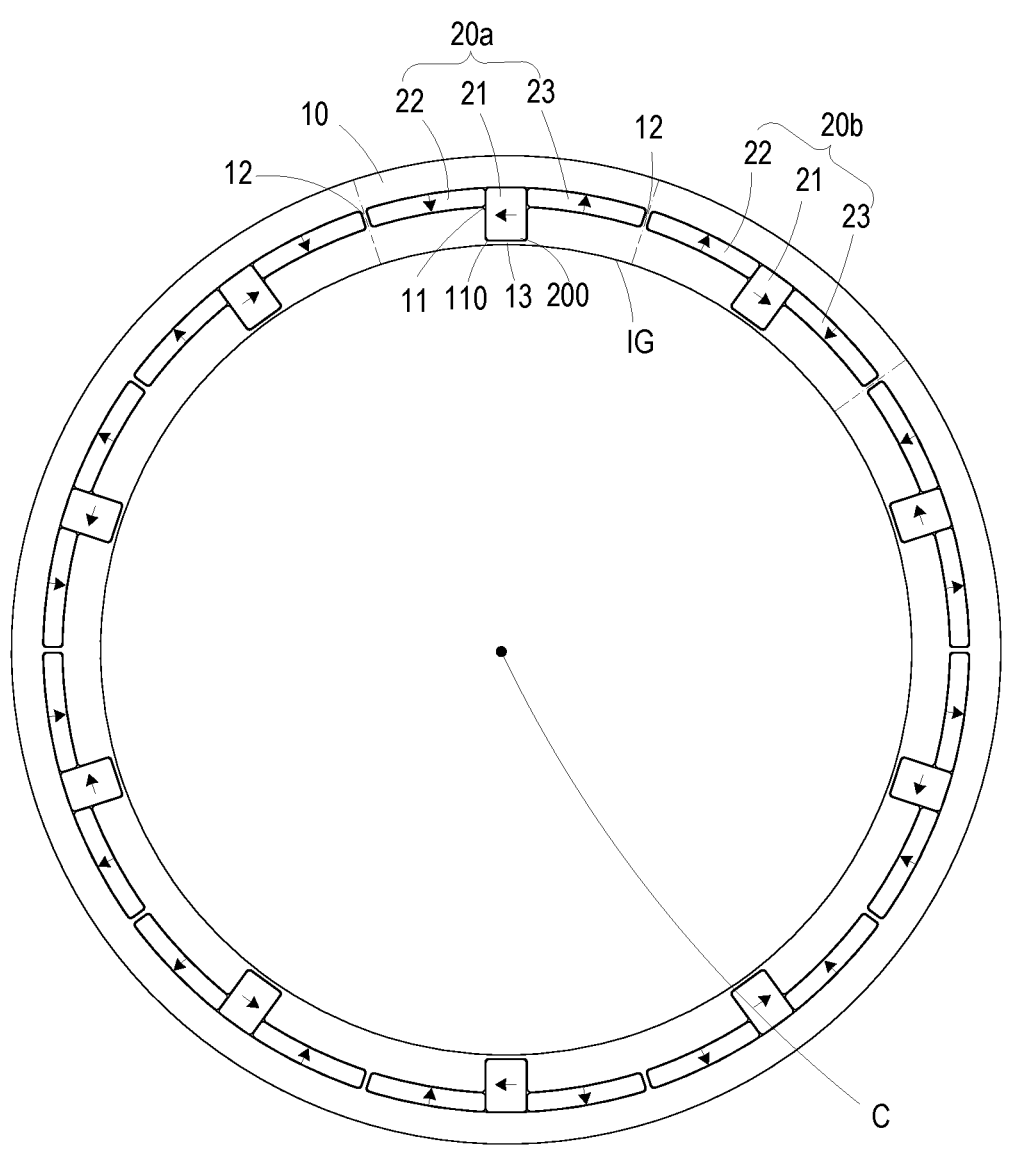
FIG. 2 is a schematic diagram illustrating the arrangement and magnetizing directions of the magnets in the flux-concentrating rotor structure according the first embodiment of the present disclosure.
Figure 3:
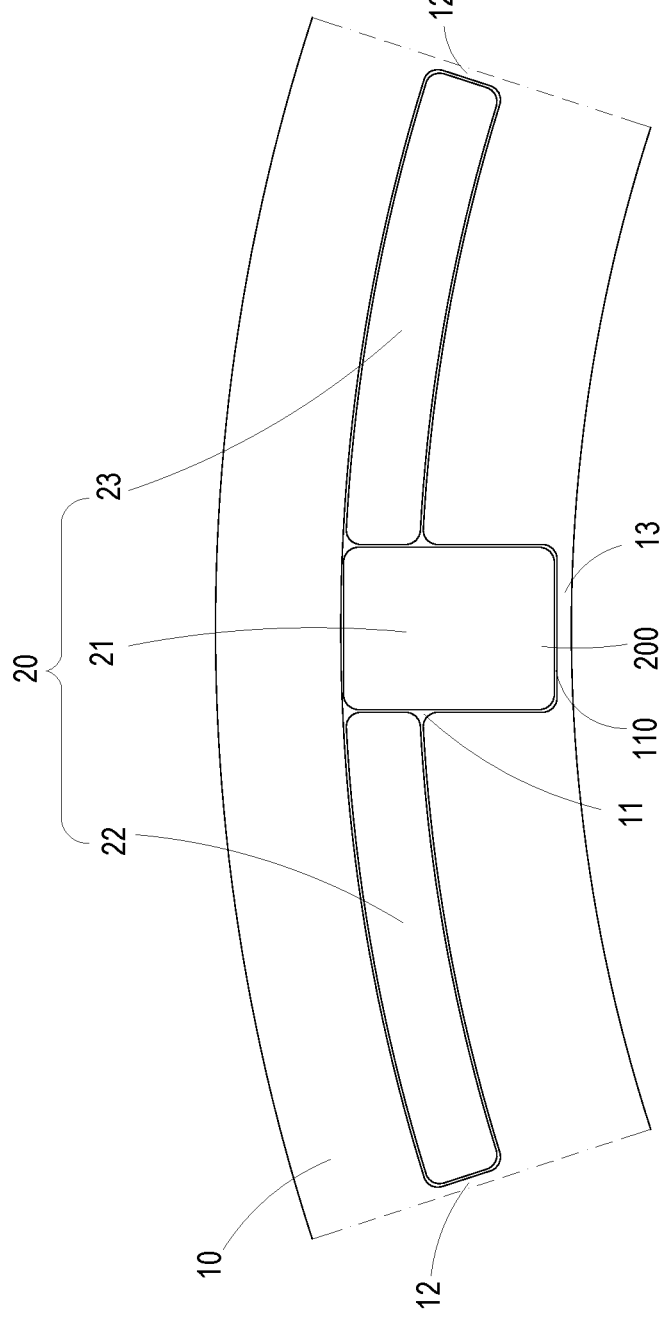
FIG. 3 is a schematic diagram illustrating one single magnet component corresponding to the magnet-receiving slot in the flux-concentrating rotor structure according the first embodiment of the present disclosure.

Please refer to FIG. 1 to FIG. 3. The present disclosure provides a flux-concentrating rotor structure 2 applied to a permanent magnet synchronous motor 1. The permanent magnet synchronous motor 1 includes the flux-concentrating rotor structure 2 and a stator 3. In the embodiment, the motor structure consists of an outer rotor and an inner stator. The flux-concentrating rotor structure 2 and the stator 3 are sleeved with each other, and an air gap G is formed therebetween. Preferably but not exclusively, the outside of the flux-concentrating rotor structure 2 away from an axis C is sleeved with a rotating shaft (not shown in the drawing) for outputting the torque generated by rotation operation. In the embodiment, the flux-concentrating rotor structure 2 substantively includes a hollow annular iron core 10 and a plurality of magnet components 20. Notably, the iron core 10 is formed by stacking a plurality of silicon steel sheets. Preferably but not exclusively, the number of the plurality of silicon steel sheets can be varied in accordance with the height requirements of the magnet components 20 in the axial direction of the motor. It is not an essential feature to limit the present disclosure, so as to be explained in advance. In the embodiment, each silicon steel sheet is a hollowed out structure, so that the plurality of silicon steel sheets are stacked to form the iron core 10 with a plurality of magnet-receiving slots 11 arranged along a circumferential direction of the iron core 10. Preferably but not exclusively, each of the magnet-receiving slots 11 has a T-shaped section in a radial direction of the iron core 10. In the embodiment, each two adjacent ones of the magnet-receiving slots 11 have a radial bridge 12 disposed therebetween, and each of the silicon steel sheets is integrally formed into one piece through the arrangement of the radial bridges 12, so that the structure of the silicon steel sheet is strengthened and it facilitates to simplify the entire assembling process. In the embodiment, the plurality of magnet components 20 are disposed around and arranged in the circumferential direction of the iron core 10. Moreover, the plurality of magnet components 20 are correspondingly received within the plurality of magnet-receiving slots 11. The plurality of magnet components 20 are spaced apart from each other through the radial bridges 12. Since the magnet component 20 are fixed through the iron core 10 formed by stacking the integrated silicon steel sheets, there is no need to use stainless steel sleeves or carbon fiber protective sleeves for protection and fixation. In this way, the assembling structure of the magnet component 20 can be strengthened and the entire assembling process can be simplified.

In the embodiment, each of the magnet components 20 includes two radial magnets 22, 23 and one tangential magnet 21, and the two radial magnets 22, 23 are respectively located on the left and right sides of the tangential magnet 21 along the circumferential direction of the iron core 10 and in contact with two corresponding lateral sides of the tangential magnet 21. In each magnet component 20, the two radial magnets 22, 23 are magnetized along the radial direction respectively and have two magnetizing directions opposite to each other. For example, one is magnetized in the direction toward the axis C, and another is magnetized in the direction away from the axis C. The aforementioned two opposite directions are both defined as the radial directions. In the embodiment, the tangential magnet 21 in each magnet component 20 is magnetized along a tangential direction of the iron core 10, and the tangential magnets 21 in two adjacent ones of the magnet components 20 have two magnetizing directions opposite to each other. For example, one is magnetized in the clockwise direction, and another is magnetized in the counterclockwise direction. The two opposite directions are defined as the tangential directions. Preferably but not exclusively, in the magnet component 20a shown in FIG. 2, the tangential magnet 21 is magnetized toward the left, the radial magnet 22 located on the left side of the tangential magnet 21 is magnetized toward the axis C, and the radial magnet 23 on the right side of the magnet 21 is magnetized in a direction away from the axis C. Preferably but not exclusively, in the magnet component 20b arranged adjacent to the magnet component 20a, the tangential magnet 21 is magnetized toward the right, the radial magnet 22 located on the left side of the tangential magnet 21 is magnetized away from the axis C, and the radial magnet 23 on the right side of the magnet 21 is magnetized toward the axis C. Referring to FIG. 1 and FIG. 2, in the identical one of magnet components 20, 20a or 20b, the corresponding tangential magnet 21 is tangentially magnetized, the two radial magnets 22 and 23 are radially magnetized respectively, and the magnetizing directions of the two radial magnets 22, 23 are opposite. It allows to improve the salient pole ratio and achieve the purposes of improving the motor reluctance torque and the capacity of the flux-weakening expansion of the motor at the same time.

In the embodiment, the radial magnets 22, 23 of each two adjacent ones of the magnet components 20 (e.g., the radial magnet 23 of the magnet component 20a and the radial magnet 22 of the magnet component 20b) are arranged adjacently through a corresponding one of the radial bridges 12, and the two radial magnets 22, 23 arranged adjacently have an identical magnetizing direction, which are magnetized along the direction away from the axis C. Based on the above arrangement, since the corresponding radial magnets 22, 23 arranged adjacently in two adjacent magnet components 20a, 20b have the identical magnetizing direction and are connected through the radial bridge 12, it is beneficial to reducing the magnet loss.

In order to make the plurality of magnet components 20 meet the aforementioned magnetizing conditions, the number of the plurality of magnet components 20 is set in an even number, and the plurality of magnet components 20 can be arranged symmetrically on the iron core 10. In the embodiment, there are ten sets of magnet components 20 respectively received in ten T-shaped magnet-receiving slots 11, and the ten sets of magnet components 20 are composed of twenty radial magnets 22, 23 and ten tangential magnets 21. In other embodiments, the flux-concentrating rotor structure 2 includes 2N magnet components 20 with 4N radial magnets 22, 23 and 2N tangential magnets 21, where N is an integer, and N=1. Certainly, the numbers of the tangential magnets 21 and the radial magnets 22, 23 are adjustable according to the practical requirements, and the present disclosure is not limited thereto.

In the embodiment, the iron core 10 further includes a plurality of circumferential bridges 13, which are disposed adjacent to bottoms 110 of the T-shaped sections of the magnet-receiving slots 11, respectively, so as to form the closed type receiving slots. That is, the plurality of magnet-receiving slots 11 are surrounded by the plurality of radial bridges 12 and the plurality of circumferential bridges 13 to form a specific slot structure in the iron core 10, and the circumferential bridge 13 is configured to contact a lateral wall of a corresponding one of the tangential magnets 21. This design can further strengthen the structure of the iron core 10. Moreover, in one single magnet component 20, the two radial magnets 22, 23 are both in the shape of a curved tile, the curved tile has a center of curvature facing the axis C, and the tangential magnet 21 is in the shape of a cuboid. It is convenient to assemble them into the T-shaped magnet-receiving slot 11, so that the radial magnets 22, 23 are respectively in contact with the left and right sides of the tangential magnet 21, and the radial magnets 22, 23 are more closely arranged around the circumferential direction of the iron core 10. In other words, each of the plurality of magnet components 20 has a T-shaped section in the radial direction of the iron core 10. In the embodiment, each of the plurality of magnet components 20 includes a bottom 200, which is formed by one lateral side of the tangential magnet 21 perpendicular to the longitudinal direction and close to the axis C. Moreover, the bottom 200 faces an air gap side where the air gap G is located. In the embodiment, the air gap side is the inner circumferential side IG of the flux-concentrating rotor structure 2. The inner circumferential side IG faces the axis C, and is provided with the stator 3 disposed inside the inner circumferential side IG (Referring to FIG. 1 and FIG. 2). Furthermore, the two radial magnets 22, 23 and the tangential magnet 21 have lateral surfaces away from the axis C to be aligned with each other along the circumferential direction. In this way, under the same magnet dosage and working conditions, the flux-concentrating capacity is further improved, so that the motor has a higher air-gap flux density, and the motor output torque capability is improved.

Figure 4:
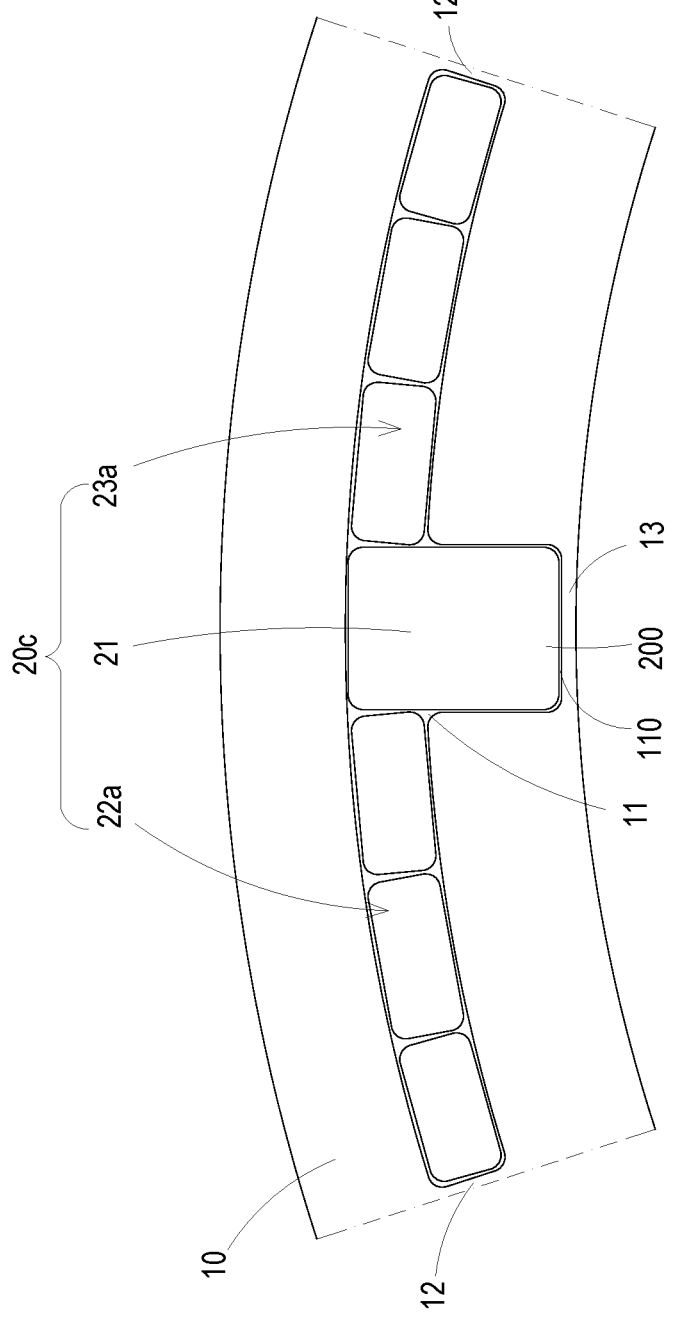
FIG. 4 is a schematic diagram showing another example of one single magnet component corresponding to the magnet-receiving slot in the flux-concentrating rotor structure according the first embodiment of the present disclosure.

Please refer to FIG. 4. It shows another example of one single magnet component corresponding to the magnet-receiving slot in the flux-concentrating rotor structure. In the embodiment, each set of the magnet components 20c is composed of three radial magnets 22a, three radial magnets 23a and one tangential magnet 21. In addition, the T-shaped magnet-receiving slots 11 pass through the upper surface and the lower surface of the iron core 10 in the axial direction. It facilitates the insertion and assembly of the tangential magnet 21 and the radial magnets 22a, 23a. Preferably but not exclusively, in the embodiment, the three radial magnets 22a or the three radial magnets 23a are respectively composed of three cuboids of magnets. The three cuboids of magnets connected in series have the same magnetizing direction. In this example, the three cuboids of magnets are magnetized in the radial direction. Preferably but not exclusively, the three radial magnets 22a are magnetized in the direction toward the axis C, and three radial magnets 23a are magnetized in the direction away from the axis C. Compared with the long magnets in the shape of the curved tiles shown in the corresponding embodiment in FIG. 3, the manufacturing cost of the combination of multiple small cuboids of magnets in this example is lower, and the producing technology is simpler. Furthermore, the connection through multiple small cuboids of magnets is more conducive to reducing the magnet loss. In other embodiments, each of the radial magnets 22a, 23a can be composed of one cuboid, a plurality of cuboids, one curved tile or a plurality of curved tiles, to further achieve the purpose of reducing the magnet loss. Certainly, the numbers and the types of the radial magnets 22a, 23a in each set of magnet components 20c are adjustable according to the practical requirements, and the present disclosure is not limited thereto. Preferably but not exclusively, in the embodiment, the two radial magnets 22a, 23a and the tangential magnet 21 have lateral surfaces away from the axis C to be aligned with each other along the circumferential direction.

Figure 5:
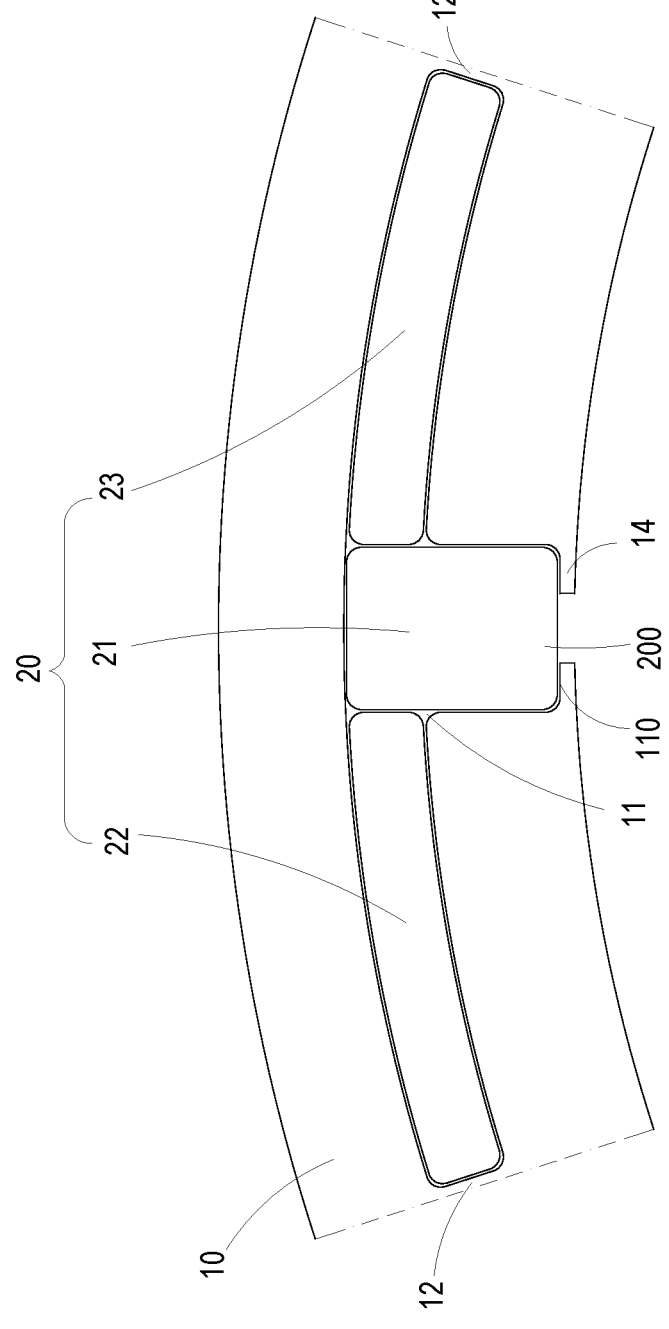
FIG. 5 is a schematic diagram showing a further example of one single magnet component corresponding to the magnet-receiving slot in the flux-concentrating rotor structure according the first embodiment of the present disclosure.

Please refer to FIG. 5. It shows a further example of one single magnet component corresponding to the magnet-receiving slot in the flux-concentrating rotor structure. Different from the structure shown in FIG. 3, the iron core 10 of this example does not have a circumferential bridge 13, but includes plural pairs of holding portions 14, which are respectively disposed adjacent to the bottoms 110 of the T-shaped sections of the magnet-receiving slots 11. Each pair of the holding portions 14 is configured to contact the lateral wall of the corresponding one of the tangential magnets 21, so as to form the open type receiving slots. In this way, under the condition of complying with the structural strength, it helps to reduce the weight of the iron core 10, reduce the core loss of the iron core 10, and improve the motor output torque capability. Certainly, the type of the magnet-receiving slots 11 is adjustable according to the practical requirements, and different modes can be combined and changed. The present disclosure is not limited thereto and not redundantly described herein. Preferably but not exclusively, in the embodiment, the two radial magnets 22, 23 and the tangential magnet 21 have lateral surfaces away from the axis C to be aligned with each other along the circumferential direction.

Figure 6:
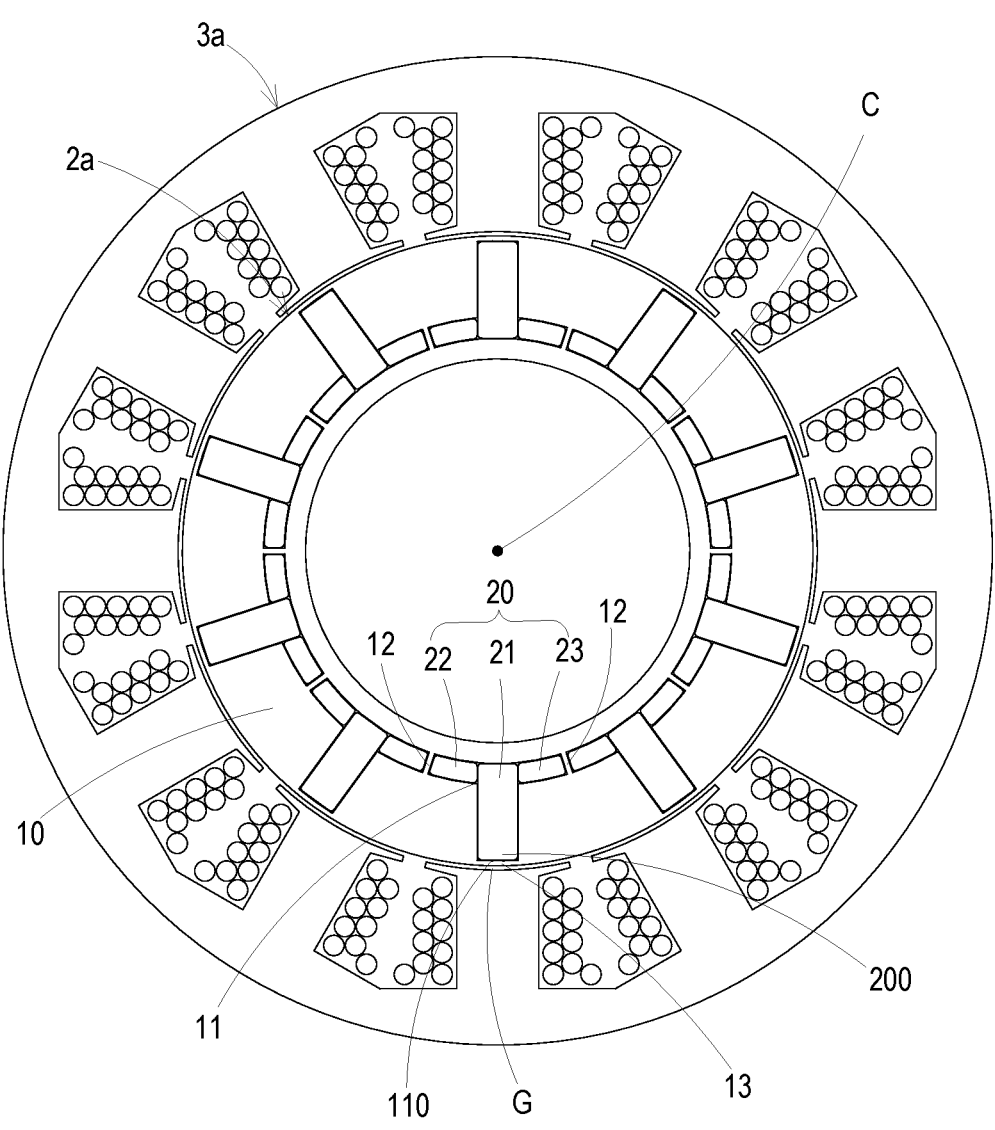
FIG. 6 is a schematic diagram illustrating a flux-concentrating rotor structure applied to a permanent magnet synchronous motor according to a second embodiment of the present disclosure.
Figure 7:
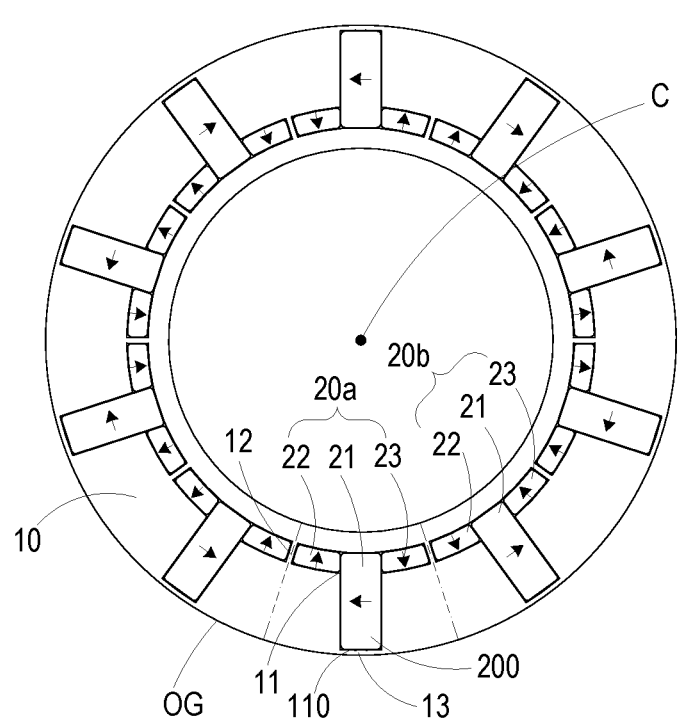
FIG. 7 is a schematic diagram illustrating the arrangement and magnetizing directions of the magnets in the flux-concentrating rotor structure according the second embodiment of the present disclosure.
Figure 8:
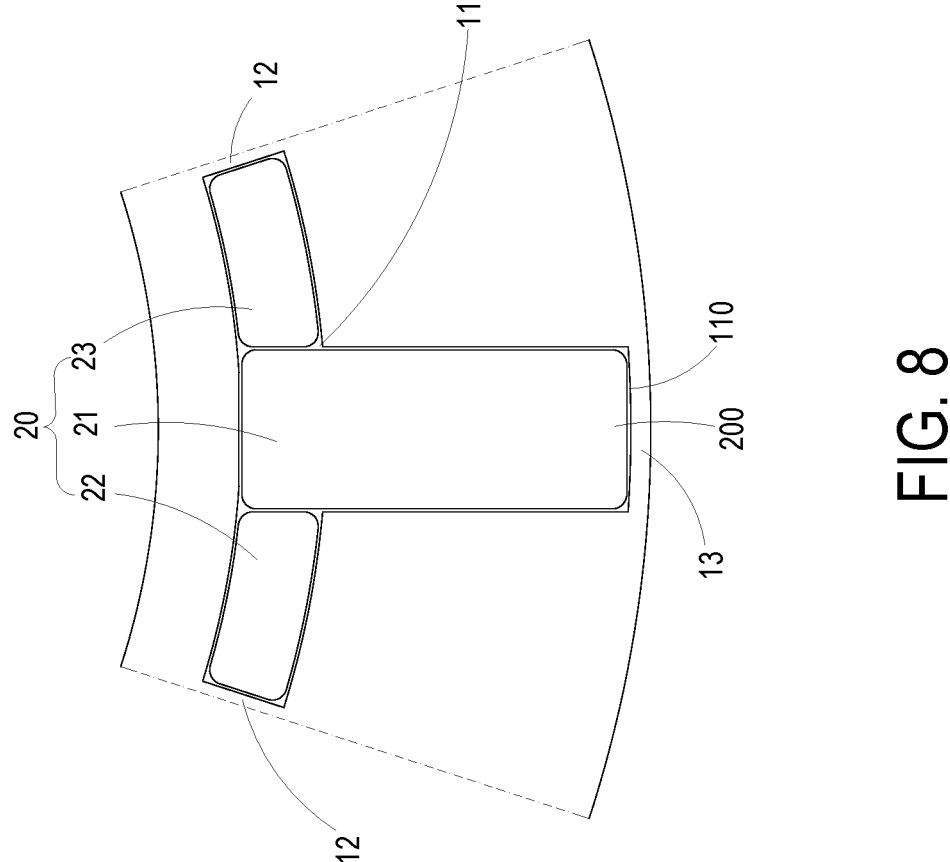
FIG. 8 is a schematic diagram illustrating one single magnet component corresponding to the magnet-receiving slot in the flux-concentrating rotor structure according the second embodiment of the present disclosure.

Please refer to FIG. 6, FIG. 7 and FIG. 8. In the second embodiment, the structures, elements and functions of the permanent magnet synchronous motor 1a and the flux-concentrating rotor structure 2a are similar to those of the permanent magnet synchronous motor 1 and the flux-concentrating rotor structure 2 of FIGS. 1 to 3, and are not redundantly described herein. In the embodiment, the permanent magnet synchronous motor 1a has the structure consisting of an inner rotor and an outer stator, and includes a flux-concentrating rotor structure 2a and a stator 3a. The flux-concentrating rotor structure 2a and the stator 3a are sleeved with each other, and an air gap G is formed therebetween. Preferably but not exclusively, the inner side of the flux-concentrating rotor structure 2a facing the axis C has a rotating shaft (not shown in the drawing) sleeved therewith for outputting the torque generated by rotation operation. In the embodiment, the flux-concentrating rotor structure 2a substantively includes a hollow annular iron core 10 and a plurality of magnet components 20. In the embodiment, each of the magnet components 20 includes two radial magnets 22, 23 and one tangential magnet 21, and the two radial magnets 22, 23 are respectively located on the left and right sides of the tangential magnet 21 along the circumferential direction of the iron core 10 and in contact with the tangential magnet 21. Referring to FIG. 7, in the magnet component 20a, the tangential magnet 21 is magnetized toward the left, the radial magnet 22 located on the left side of the tangential magnet 21 is magnetized toward the axis C, and the radial magnet 23 on the right side of the magnet 21 is magnetized in a direction away from the axis C. Preferably but not exclusively, in the magnet component 20b arranged adjacent to the magnet component 20a, the tangential magnet 21 is magnetized toward the right, the radial magnet 22 located on the left side of the tangential magnet 21 is magnetized away from the axis C, and the radial magnet 23 on the right side of the magnet 21 is magnetized toward the axis C. Referring to FIG. 6, FIG. 7 and FIG. 8, in the identical one of magnet components 20, 20*a* or 20*b*, the corresponding tangential magnet 21 is tangentially magnetized, the two radial magnets 22 and 23 are radially magnetized respectively, and the magnetizing directions of the two radial magnets 22, 23 are opposite. It allows to improve the salient pole ratio and achieve the purposes of improving the motor reluctance torque and the capacity of the flux-weakening expansion of the motor at the same time.

Furthermore, in the embodiment, as shown in FIG. 7, the radial magnet 23 of the magnet component 20*a* and the radial magnet 22 of the adjacent magnet component 20*b* are arranged adjacently through the corresponding one of the radial bridges 12, and the two radial magnets 22, 23 arranged adjacently have an identical magnetizing direction, which are magnetized along the direction away from the axis C. Since the corresponding radial magnets 22, 23 arranged adjacently in two adjacent magnet components 20*a*, 20*b* have the identical magnetizing direction and are connected through the radial bridge 12, it is beneficial to reducing the magnet loss. Preferably but not exclusively, in the embodiment, the two radial magnets 22, 23 and the tangential magnet 21 have lateral surfaces close to the axis C to be aligned with each other along the circumferential direction.

In the embodiment, the iron core 10 further includes a plurality of circumferential bridges 13, which are disposed adjacent to bottoms 110 of the T-shaped sections of the magnet-receiving slots 11, respectively, so as to form the closed type receiving slots. That is, the plurality of magnet-receiving slots 11 are surrounded by the plurality of radial bridges 12 and the plurality of circumferential bridges 13 to form a specific slot structure in the iron core 10, and the circumferential bridge 13 is configured to contact a lateral wall of a corresponding one of the tangential magnets 21. This design can further strengthen the structure of the iron core 10. Moreover, in one single magnet component 20, the two radial magnets 22, 23 are both in the shape of a curved tile, the curved tile has a center of curvature facing the axis C, and the tangential magnet 21 is in the shape of a cuboid. It is convenient to assemble them into the T-shaped magnet-receiving slot 11, so that, each of the plurality of magnet components 20 has a T-shaped section in the radial direction of the iron core 10. In the embodiment, each of the plurality of magnet components 20 includes a bottom 200, which is formed by one lateral side of the tangential magnet 21 perpendicular to the longitudinal direction and close to the axis C. Moreover, the bottom 200 faces an air gap side where the air gap G is located. In the embodiment, the air gap side is the outer circumferential side OG of the flux-concentrating rotor structure 2*a*. The outer circumferential side OG faces away the axis C, and is provided with the stator 3*a* disposed outside the outer circumferential side OG (Referring to FIG. 6, FIG. 7 and FIG. 8). In this way, under the same magnet dosage and working conditions, the flux-concentrating capacity is further improved, so that the motor has a higher air-gap flux density, and the motor output torque capability is improved.

In summary, the present disclosure provides a flux-concentrating rotor structure applied to a permanent magnet synchronous motor. By fixing magnet components through an integrated rotor core, it facilitates the entire structure to be produced and assembled. Moreover, under the same magnet dosage and working conditions, the flux-concentrating capacity is further improved, so that the motor has a higher air-gap flux density, and the motor output torque capability is improved. At the same time, the purposes of improving the motor salient pole ratio, the motor reluctance torque and the capacity of the flux-weakening expansion of the motor are achieved. The flux-concentrating rotor structure of the present disclosure is suitable for the motor architecture with an outer rotor or an inter rotor. Since the magnet components are fixed through an iron core formed by stacking integrated silicon steel sheets, there is no need to use stainless steel sleeves or carbon fiber protective sleeves for protection and fixation. The iron core is formed by stacking multiple layers of silicon steel sheets, and a plurality of T-shaped magnet-receiving slots are spaced apart to each other on the iron core through multiple radial bridges. In that, each of the multiple layers of silicon steel sheets is integrally formed, and it helps to simplify the entire manufacturing and assembling processes. As long as the silicon steel sheet meets the structural strength requirements, the magnet-receiving slot is not limited to an open type or a closed type. Each magnet component is composed of two radial magnets and one tangential magnet. For example, the two radial magnets are both in the shape of a curved tile, and the tangential magnet is in the shape of a cuboid. The two radial magnets are located on both sides of the tangential magnet and in contact with the tangential magnet. By placing the two radial magnets on both sides of the tangential magnet in the magnet-receiving slot, the assembly of the magnet component is completed easily. In addition, the two radial magnets and the one tangential magnet in one magnet component are arranged in a T-shaped structure on a radial section of the iron core, and the bottom of the T-shaped magnet component can face the air gap side of the motor. In this way, under the same magnet dosage and the same working conditions, it allows to improve the flux-concentrating capacity, whereby the motor has a higher air-gap flux density, and the motor output torque capability is improved. In the same magnet component, the tangential magnet is magnetized along a tangential direction of the iron core, the two radial magnets are magnetized along the radial direction of the iron core, and the magnetizing directions of the two radial magnets are opposite to each other. With the arrangement of the magnetizing directions, it allows to increase the motor salient pole ratio of the motor, and the purposes of increasing the motor reluctance torque and improving the capacity of the flux-weakening expansion of the motor are achieved at the same time. Furthermore, the two radial magnets correspondingly arranged in adjacent two sets of magnet components have an identical magnetizing direction and are connected through a radial bridge, and it is beneficial to reducing the magnet loss. On the other hand, in one single magnet component, the two radial magnets are both in the shape of a curved tile, and the tangential magnet is in the shape of a cuboid to facilitate assembly into the T-shaped magnet-receiving slot. Certainly, each radial magnet can also be composed of one cuboid, a plurality of cuboids, one curved tile or a plurality of curved tiles, to further reduce the magnet loss.

While the disclosure has been described in terms of what is presently considered to be the most practical and preferred embodiments, it is intended to cover various modifications and similar arrangements included within the spirit and scope of the appended claims which are to be accorded with the broadest interpretation so as to encompass all such modifications and similar structures.

What is claimed is:

1. A flux-concentrating rotor structure, comprising:

an iron core, formed by stacking a plurality of silicon steel sheets and comprising a plurality of magnet-receiving slots arranged along a circumferential direction of the iron core, wherein each of the magnet-receiving slots has a T-shaped section in a radial direction of the iron core, wherein each two adjacent ones of the magnet-receiving slots have a radial bridge disposed therebetween, whereby each of the silicon steel sheets is integrally formed into one piece; and a plurality of magnet components, disposed around and arranged in the iron core, and correspondingly received within the plurality of magnet-receiving slots, wherein each of the magnet components includes two radial magnets and one tangential magnet, and the two radial magnets are located on both sides of the tangential magnet along the circumferential direction and in contact with the tangential magnet, wherein the two radial magnets in each of the magnet components are magnetized along the radial direction respectively and have two magnetizing directions opposite to each other, and wherein the tangential magnet is magnetized along a tangential direction of the iron core, and the tangential magnets in two adjacent ones of the magnet components have two opposite magnetizing directions correspondingly.

2. The flux-concentrating rotor structure according to claim 1, being used to construct a permanent magnet synchronous motor, wherein the permanent magnet synchronous motor comprises a stator sleeved outside or inside the flux-concentrating rotor structure in the radial direction, and an air gap is formed between the stator and the flux-concentrating rotor structure.

3. The flux-concentrating rotor structure according to claim 1, wherein the plurality of magnet components disposed on each of the silicon steel sheets are spaced apart from each other through the radial bridges.

4. The flux-concentrating rotor structure according to claim 1, wherein the radial magnets of each two adjacent ones of the magnet components are arranged adjacently through a corresponding one of the radial bridges and have an identical magnetizing direction relative to each other.

5. The flux-concentrating rotor structure according to claim 1, wherein the two radial magnets in each one of the magnet components are both in the shape of a curved tile, the curved tile has a center of curvature facing an axis, and the tangential magnet is in the shape of a cuboid.

6. The flux-concentrating rotor structure according to claim 1, wherein each of the two radial magnets in each one of the magnet components is composed of one cuboid, a plurality of cuboids, one curved tile or a plurality of curved tiles.

7. The flux-concentrating rotor structure according to claim 1, wherein each of the magnet components has a T-shaped section in the radial direction of the iron core.

8. The flux-concentrating rotor structure according to claim 1, wherein the T-shaped section comprises a bottom formed by a lateral side of the tangential magnet, and the bottom faces an air gap side.

9. The flux-concentrating rotor structure according to claim 8, wherein the flux-concentrating rotor structure is an outer rotor, the section of the iron core in the radial direction is a hollow annular, the bottom faces an inner circumferential side, and an inner stator is correspondingly disposed inside the inner circumferential side.

10. The flux-concentrating rotor structure according to claim 9, wherein the two radial magnets and the tangential magnet have lateral surfaces away from an axis to be aligned with each other along the circumferential direction.

11. The flux-concentrating rotor structure according to claim 8, wherein the flux-concentrating rotor structure is an inner rotor, the section of the iron core in the radial direction is a hollow annular, the bottom faces an outer circumferential side, and an outer stator is correspondingly disposed outside the outer circumferential side.

12. The flux-concentrating rotor structure according to claim 11, wherein the two radial magnets and the tangential magnet have lateral surfaces close to an axis to be aligned with each other along the circumferential direction.

13. The flux-concentrating rotor structure according to claim 1, wherein the iron core further comprises a plurality of circumferential bridges disposed adjacent to bottoms of the T-shaped sections of the magnet-receiving slots, and each of the circumferential bridges is configured to contact a lateral wall of a corresponding one of the tangential magnets.

14. The flux-concentrating rotor structure according to claim 1, wherein the iron core further comprises a plural pairs of holding portions disposed adjacent to bottoms of the T-shaped sections of the magnet-receiving slots, and each pair of the holding portions is configured to contact a lateral wall of a corresponding one of the tangential magnets.

15. The flux-concentrating rotor structure according to claim 1, wherein the plurality of magnet components includes 2N magnet components with 4N radial magnets and 2N tangential magnets, wherein N is an integer, and N≥1.

* * * * *